US012676763B2

(12) United States Patent
Gauthier et al.

(10) Patent No.: US 12,676,763 B2
(45) Date of Patent: Jul. 7, 2026

(54) SYSTEMS AND METHODS USING PHYSICALLY UNCLONABLE FUNCTIONS WITHOUT A CHALLENGE-RESPONSE DATABASE

(71) Applicants: Ohio State Innovation Foundation, Columbus, OH (US); Andrew Joseph Pomerance, Alexandria, VA (US)

(72) Inventors: Daniel Gauthier, Hilliard, OH (US); Andrew Joseph Pomerance, Alexandria, VA (US)

(73) Assignee: Ohio State Innovation Foundation, Columbus, OH (US)

( * ) Notice: Subject to any disclaimer, the term of this patent is extended or adjusted under 35 U.S.C. 154(b) by 513 days.

(21) Appl. No.: 18/123,595

(22) Filed: Mar. 20, 2023

(65) Prior Publication Data

US 2024/0056317 A1    Feb. 15, 2024

Related U.S. Application Data

(60) Provisional application No. 63/321,355, filed on Mar. 18, 2022.

(51) Int. Cl.
*H04L 9/40*        (2022.01)
*H04L 9/06*        (2006.01)
*H04L 9/32*        (2006.01)

(52) U.S. Cl.
CPC .......... *H04L 9/3278* (2013.01); *H04L 9/0656* (2013.01); *H04L 9/3236* (2013.01)

(58) Field of Classification Search
CPC .... H04L 9/3278; H04L 9/0656; H04L 9/3236
See application file for complete search history.

(56) References Cited

U.S. PATENT DOCUMENTS

| | | | |
|---|---|---|---|
| 7,653,197 B2 | 1/2010 | Van Dijk | |
| 9,787,480 B2 * | 10/2017 | Guo ......................... | G06F 7/588 |
| 2022/0116233 A1 * | 4/2022 | Hoffman ............... | H04L 9/3278 |
| 2022/0417041 A1 * | 12/2022 | Howard ................... | H04L 9/14 |
| 2023/0179434 A1 * | 6/2023 | Ganji ................ | H03K 19/1737 |
| | | | 326/8 |

FOREIGN PATENT DOCUMENTS

WO        2020247059        12/2020

OTHER PUBLICATIONS

N. Charlot, D. Canaday, A. Pomerance, and D. J. Gauthier, 'Hybrid Boolean networks as physically unclonable functions,' IEEE Access 9, 44855 (2021).
M. van Dijk and U. R"uhrmair, 'Physical unclonable functions in cryptographic protocols: Security proofs and impossibility results,' IACR Cryptology ePrint Archive, vol. 2012, pp. 228, Apr. 2012.

* cited by examiner

*Primary Examiner* — Thaddeus J Plecha
(74) *Attorney, Agent, or Firm* — Meunier Carlin & Curfman LLC

(57)        ABSTRACT

Described herein are methods and systems implementing physically unclonable functions (PUFs). An example method includes: inputting a first challenge bit string into a first PUF; capturing a first response bit string from the first PUF; inputting a second challenge bit string into a second PUF; capturing a second response bit string from the second PUF; performing a hash operation on the first response bit string and the second response bit string, the hash operation generating a hashed-response bit string; and storing the first and second challenge bit strings and the hashed-response bit string in a first database.

20 Claims, 5 Drawing Sheets

┌─ 400

┌─────────────────────────────────────┐
│ Input a first challenge bit string into a first physically │
│ unclonable function (PUF) │
│ 402 │
└─────────────────────────────────────┘
                    ↓
┌─────────────────────────────────────┐
│ Capture a first response bit string from the first PUF │
│ 404 │
└─────────────────────────────────────┘
                    ↓
┌─────────────────────────────────────┐
│ Input a second challenge bit string into a second PUF │
│ 406 │
└─────────────────────────────────────┘
                    ↓
┌─────────────────────────────────────┐
│ Capture a second response bit string from the second PUF │
│ 408 │
└─────────────────────────────────────┘
                    ↓
┌─────────────────────────────────────┐
│ Perform a hash operation on the first response bit string │
│ of the first PUF and the second response bit string of the │
│ second PUF, the hash operation generating a hashed- │
│ response bit string │
│ 410 │
└─────────────────────────────────────┘
                    ↓
┌─────────────────────────────────────┐
│ Store the first and second challenge bit string and the │
│ hashed-response bit string in a first database │
│ 412 │
└─────────────────────────────────────┘

100

Table 1

| A | B | A ? ?? |
|---|---|---|
| False | False | False |
| False | True | True |
| True | False | True |
| True | True | False |

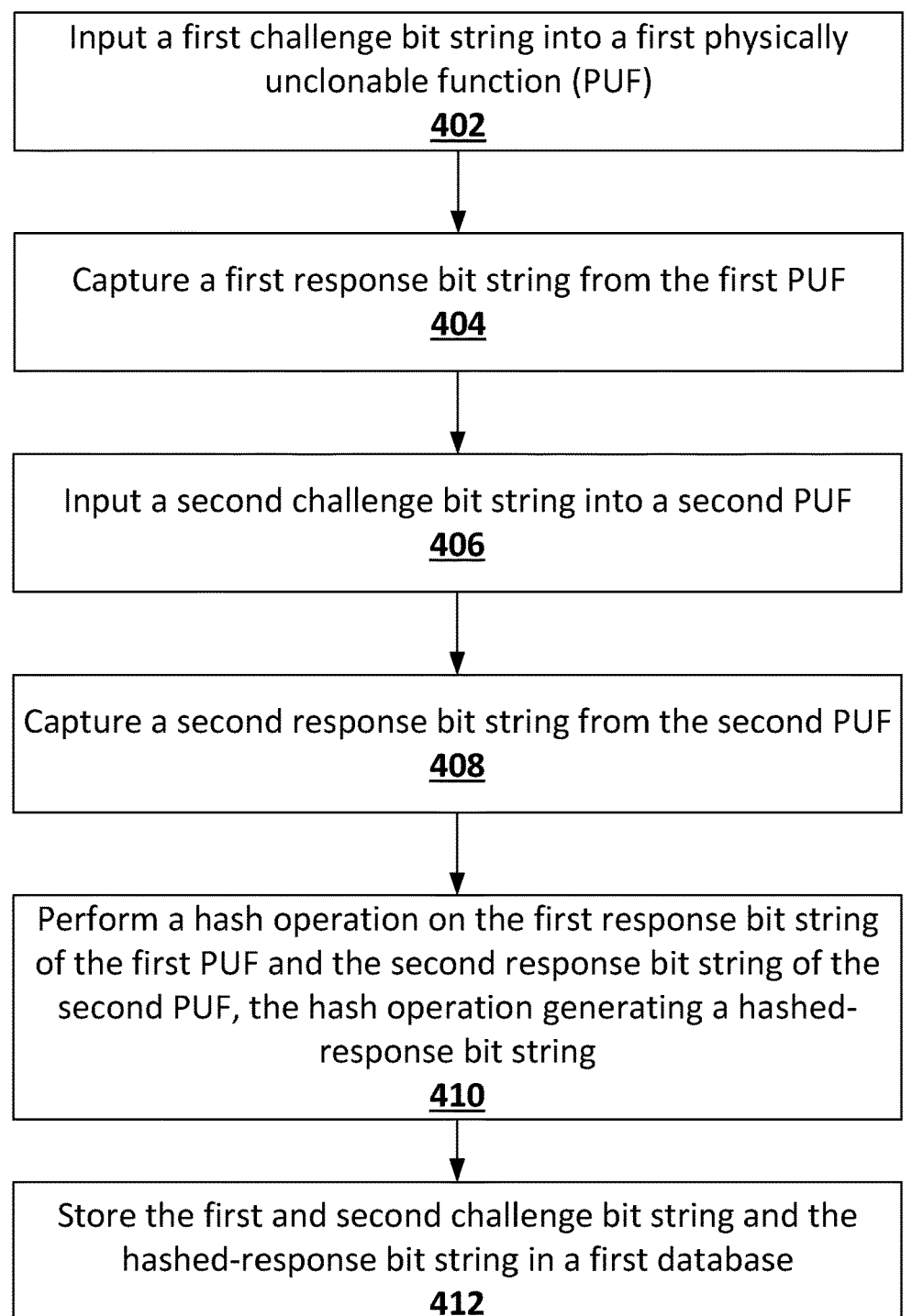

Input a first challenge bit string into a first physically unclonable function (PUF)
402

Capture a first response bit string from the first PUF
404

Input a second challenge bit string into a second PUF
406

Capture a second response bit string from the second PUF
408

Perform a hash operation on the first response bit string of the first PUF and the second response bit string of the second PUF, the hash operation generating a hashed-response bit string
410

Store the first and second challenge bit string and the hashed-response bit string in a first database
412

*FIG. 4*

SYSTEMS AND METHODS USING PHYSICALLY UNCLONABLE FUNCTIONS WITHOUT A CHALLENGE-RESPONSE DATABASE

RELATED APPLICATIONS

This application claims priority to, and the benefit of, U.S. Provisional Patent Application No. 63/321,355, filed Mar. 18, 2022, entitled "SYSTEMS AND METHODS USING PHYSICALLY UNCLONABLE FUNCTIONS WITHOUT A CHALLENGE-RESPONSE DATABASE," the content of which is hereby incorporated by reference herein in its entirety.

STATEMENT REGARDING FEDERALLY FUNDED RESEARCH

This invention was made with government support under Grant no. W31P4Q-20-C-0003 awarded by the U.S. Department of the Army. The government has certain rights in the invention.

BACKGROUND

Physically unclonable functions ("PUFs") can be used to generate unique "fingerprints" or cryptographic keys. These "fingerprints" or cryptographic keys can be generated as a response to an input (e.g., a challenge). Conventional methods of using PUFs require storing the challenges and responses in a secure challenge response database. This database can be a security vulnerability because a person who gains access to the database can break an authentication/encryption protocol that is based on the database. In other words, the database of challenges and responses must be secured and kept secret to avoid third parties using the database to break the authentication/encryption protocol. Therefore, what is needed are systems and methods for implementing PUFs when the challenge response database is not secret and/or vulnerable to compromise.

SUMMARY

Described herein are systems and methods for using physically unclonable functions (PUFs). An example method includes inputting a first challenge bit string into a first physically unclonable function (PUF); capturing a first response bit string from the first PUF; inputting a second challenge bit string into a second PUF; capturing a second response bit string from the second PUF; performing a hash operation on the first response bit string from the first PUF and the second response bit string of the second PUF, the hash operation generating a hashed-response bit string; and storing the first and second challenge bit string and the hashed-response bit string in a first database.

In some implementations, the method can include deleting the first and second response bit strings after performing the hash operation.

In some implementations, the step of performing a hash operation includes performing an XOR operation on the first response bit string of the first PUF and second response bit string of the second PUF.

In some implementations, the method can include inputting a third challenge bit string into the first PUF; capturing a third response bit string from the first PUF; inputting a challenge bit string into a third PUF; capturing a fourth response bit string from the third PUF; performing a second hash operation on the third response bit string of the first PUF and the fourth response bit string of the third PUF, the hash operation generating a second hashed-response bit string; and storing the third and fourth second challenge bit strings and the first challenge bit string in a second database.

In some implementations, at least one of the first PUF, the second PUF, and the third PUF is embodied as an integrated circuit (IC) chip.

In some implementations, the IC chip is a field-programmable gate array (FPGA) or an application-specific integrated circuit (ASIC).

In some implementations, the method can include using the first database for cybersecurity. Alternatively or additionally, the method can include using the first database for encrypting or decrypting a message. Optionally, the method can include selecting a challenge-hashed-response pair from the first database, the challenge-hashed-response pair being a one-time pad.

In some implementations, the method includes maintaining the first database as a publicly accessible database.

In another aspect, the present disclosure relates to a method for performing authentication. In one implementation, the method includes receiving a first response bit string associated with a first physically unclonable function (PUF) and an index, where the first response bit string corresponds to the index; querying, using the index, a database to obtain a challenge bit string and a hashed-response bit string, the challenge bit string and the hashed-response bit string corresponding to the index; inputting the challenge bit string into a second PUF; capturing a second response bit string from the second PUF; determining an authentication bit string based on the hashed-response bit string and the second response bit string; and performing authentication of the first PUF by comparing the first response bit string and the authentication bit string.

In some implementations, the first response bit string and the index are received from a remote device over a network.

In some implementations, the method includes maintaining the database, where the database includes a plurality of challenge-hashed-response pairs, each challenge-hashed-response pair comprising a respective challenge bit string and a respective hashed-response bit string.

In some implementations, the first PUF is authenticated when the authentication bit string is identical to the first response bit string.

In some implementations, the first PUF is not authenticated when the authentication bit string is not identical to the first response bit string.

In some implementations, the method includes using the first PUF to restrict access to one or more databases.

In another aspect, the present disclosure relates to a system using physically unclonable functions. In one implementation, the system includes: a processor; and a memory operably coupled to a processor, the memory having computer-executable instructions stored thereon, that when executed by the processor, cause the processor to: input a first challenge bit string into a first physically unclonable function (PUF); capture a first response bit string from the first PUF; input a second challenge bit string into a second PUF; capture a second response bit string from the second PUF; perform a hash operation on the first response bit string of the first PUF and the second response bit string of the second PUF, the hash operation generating a hashed-response bit string; and store the first and second challenge bit strings and the hashed-response bit string in a first database.

In another aspect, the present disclosure relates to a system for performing an authentication. In one implementation, the system includes a processor; and a memory operably coupled to a processor, the memory having computer-executable instructions stored thereon, that when executed by the processor, cause the processor to: receive a first response bit string associated with a first physically unclonable function (PUF) and an index, where the first response bit string corresponds to the index; query, using the index, a database to obtain a challenge bit string and a hashed-response bit string, the challenge bit string and the hashed-response bit string corresponding to the index; input the challenge bit string into a second PUF; capture a second response bit string from the second PUF; determine an authentication bit string based on the hashed-response bit string and the second response bit string; and perform authentication of the first PUF by comparing the first response bit string and the authentication bit string.

In accordance with certain embodiments, a system is provided. The system can include: a physical device; a first IC chip comprising a first PUF configured to receive a first challenge bit string from the physical device, and generate a first response bit string; a second IC chip comprising a second PUF configured to receive the first response bit string from the first PUF, receive a second challenge bit string from the physical device, and generate a second response bit string, wherein: the physical device is configured to capture the second response bit string from the second PUF, and perform a hash operation on the first response bit string of the first PUF and the second response bit string of the second PUF, the hash operation generating a hashed-response bit string; and a database configured to receive and store the first challenge bit string, the second challenge bit string, and the hashed-response bit string.

In some implementations, each of the first PUF and the second PUF comprises a hybrid Boolean network.

In some implementations, each of the first PUF and the second PUF comprises a hybrid Boolean network.

In some implementations, the step of performing the hash operation comprises performing an XOR operation on the first response bit string of the first PUF and the second response bit string of the second PUF.

In some implementations, the IC chip is a FPGA or an ASIC.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4 illustrates a method for securing responses of one or more PUFs using another PUF according to one implementation of the present disclosure.

DETAILED DESCRIPTION

Figure 1:
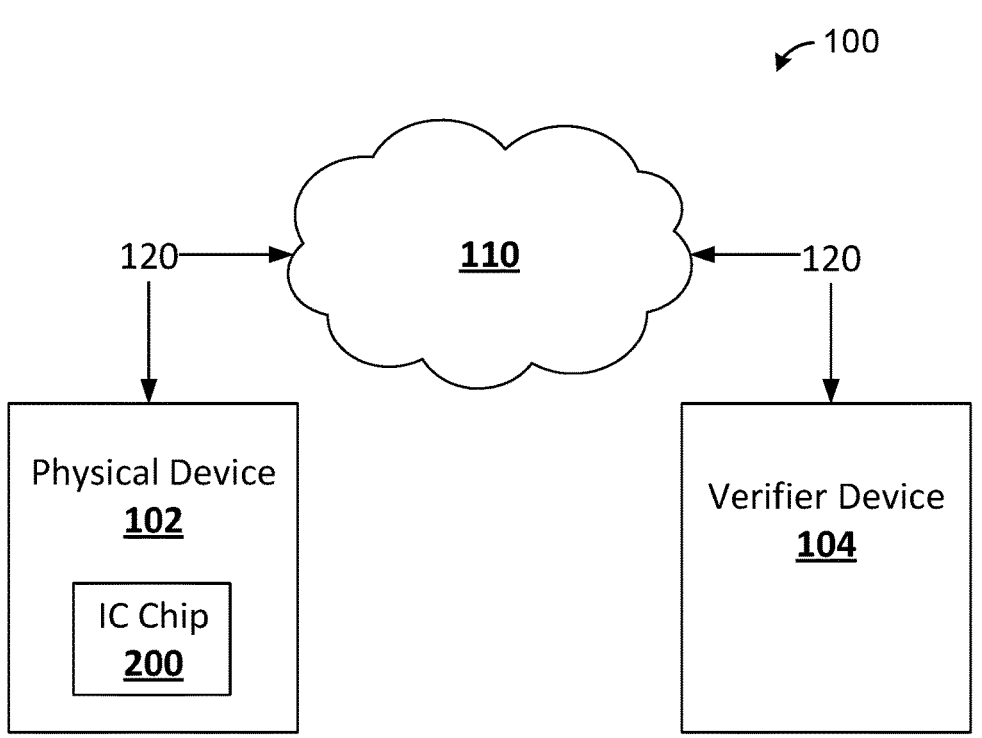
FIG. 1 is a block diagram of an example system according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for authentication and encryption, it will become evident to those skilled in the art that the implementations are not limited thereto, but are applicable for other protocols and methods based on PUFs.

A physically unclonable function (PUF) is a hardware cybersecurity primitive. A PUF produces a unique, unpredictable response when queried with a challenge. A PUF therefore provides a unique fingerprint (e.g., a "silicon fingerprint"), which is the result of entropy derived from manufacturing variances. PUFs can be used for cybersecurity applications including, but not limited to, secure key generation, memoryless key storage, device authentication, anti-counterfeiting, and intellectual property protection. Using a PUF requires the user to present a "challenge" set of information (such as a set of binary bits), and the PUF generates a "response" set of information, which is then checked against a challenge-response pair (CRP) database. Conventional PUF devices tend to be slow (e.g., a long time between challenge and response) and/or produce a response bit sequence that is much smaller than the challenge bit sequence, thus limiting the security of the PUF. Also, conventional PUF's can be "learned," that is, the set of challenge-response pairs can be deduced using various attack strategies such as using machine learning. In contrast, a PUF based on transient, likely chaotic, dynamics of a hybrid Boolean network realized on a field-programmable gate array (FPGA) or application-specific integrated circuit (ASIC) are described herein. Slight manufacturing differences in the FPGA or ASIC, such as logic element rise and fall times, logic element threshold differences, and slight differences in delay of signals propagating on the chip, cause different transient behaviors of the Boolean network (different responses) to different challenge bit sequences, which are used as initial conditions for the network.

Referring now to FIG. 1, an example system 100 is shown. The system includes a physical device 102 and a verifier device 104, where the physical device 102 is operably coupled to the verifier device 104. The physical device 102 and the verifier device 104 can be operably coupled by one or more communication links. This disclosure contemplates that the one or more communication links are any suitable communication link. For example, a communication link may be implemented by any medium that facilitates data exchange between the physical device 102 and the verifier device 104 including, but not limited to, wired, wireless, and optical links. This disclosure contemplates that each of the physical device 102 and the verifier device 104 can be or can include a computing device (e.g., at least a processing unit and memory such as the basic computing device configuration of box 602 shown in FIG. 6). Additionally, this disclosure contemplates that the physical device 102 can be an electronic device, for example, including but not limited to a consumer electronic device.

Optionally, and as shown in FIG. 1, the physical device 102 and the verifier device 104 are operably coupled via one or more networks 110. This disclosure contemplates that the one or more networks 110 are any suitable communication network. The networks 110 can be similar to each other in one or more respects. Alternatively or additionally, the networks 110 can be different from each other in one or more respects. The networks 110 can include a local area network (LAN), a wireless local area network (WLAN), a wide area network (WAN), a metropolitan area network (MAN), a virtual private network (VPN), etc., including portions or combinations of any of the above networks. The physical device 102 and the verifier device 104 can be coupled to the networks 110 through one or more communication links 120, e.g., any medium that facilitates data exchange between the physical device 102 and the verifier device 104 including, but not limited to, wired, wireless and optical links.

As shown in FIG. 1, the physical device 102 includes an integrated circuit (IC) chip 200. In some implementations, the IC chip 200 includes a field-programmable gate array (FPGA). An FPGA is a device used in electronic circuits. An FPGA is a semiconductor device including programmable logic blocks and interconnects. An FPGA is capable of being programmed after manufacture, for example, using a hardware description language (HDL). FPGAs are known in the art and therefore not described in further detail here. Alternatively, in other implementations, the IC chip 200 is an application-specific IC (ASIC). An ASIC is a customized IC chip. Unlike an FPGA, an ASIC is not capable of being programmed after manufacture. ASICs are known in the art and therefore not described in further detail here. The IC chip 200 is a component part of the physical device 102. For example, the IC chip 200 is arranged in/on, incorporated into, and/or embedded in the physical device 102. As described herein, the IC chip 200 includes a PUF, which includes a circuit configured to exhibit chaotic behavior. In some implementations described herein (e.g., with regard to FIG. 2), the PUF is a hybrid Boolean network. Alternatively, in other implementations, this disclosure contemplates that the PUF can be another type of circuit configured to exhibit chaotic behavior.

As described below, the physical device 102 is configured to input a challenge bit string into the PUF, where the challenge bit string sets an initial state of the circuit, and then release the PUF from the initial state. The physical device 102 is therefore configured to set the challenge and trigger release of the PUF. The physical device 102 is further configured to capture a transient response bit string from the PUF. As described herein, the physical device 102 can generate an enable signal, which triggers release of the PUF from the challenge state and capture of the transient response bit string from the PUF. For example, the physical device 102 can store the transient response bit string in memory. The transient response bit string is used to provide cybersecurity as described herein.

After the physical device 102 is manufactured, challenge-response pairs (CRPs) are generated and stored in memory of a computing device, e.g., in a database (also referred to herein as a "challenge-response pair database" or "CRP database"). This process is known as the enrollment phase. This disclosure contemplates performing enrollment with the verifier device 104. In other words, the verifier device 104 is configured to input one or more challenge bit strings into the physical device 102 which then inputs the challenge bit string into the PUF, releases the PUF from its initial state, and captures the respective one or more response bit strings from the PUF. The verifier device 104 is configured to associate respective challenge-response pairs (i.e., associate respective challenge and response bit strings) by maintaining the database.

In this implementation, the verifier device 104 sends a challenge bit string to physical device 102 and requests the corresponding response bit stream. The physical device 102 receives the challenge bit string from the verifier device 104. The physical device 102 inputs the challenge bit string received from the verifier device 104 into the PUF, releases the PUF from its initial state, and captures a transient response bit string. The physical device 102 then transmits the captured transient response bit string to the verifier device 104, which queries the CRP database to determine whether the transient response bit string is associated with the challenge bit string. The verifier device 104 then transmits a result of the CRP database query to the physical device 102. The PUF is expected to produce a unique, unpredictable response when queried with a challenge. Thus, a particular transient response bit string should be received in response to a particular challenge bit string. This disclosure contemplates the challenge and response bit strings are communicated between the physical device 102 and the verifier device 104 via the networks 110.

Figure 2:
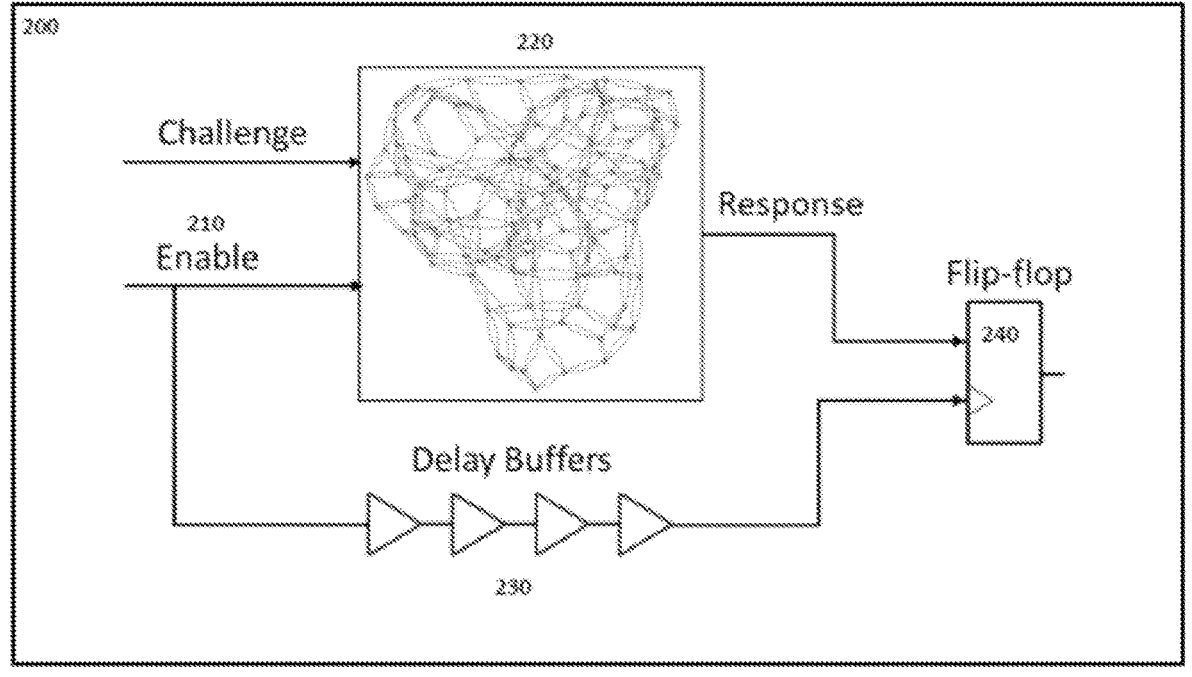
FIG. 2 is a block diagram of an example integrated circuit (IC) chip according to implementations described herein.

Referring now to FIG. 2, an example IC chip is described shown. The IC chip 200 includes a PUF 220, an auxiliary circuit 230, and a register 240. As shown in FIG. 2, a transient response enable signal 210 is received by both the PUF 220 and the auxiliary circuit 230. In some implementations, the transient response enable signal 210 is generated by and transmitted to the IC chip from a physical device (e.g., physical device 102 shown in FIG. 1). For example, the transient response enable signal 210 may be generated by a signal generator of the physical device. The transient response enable signal 210 is fed through the auxiliary circuit 230 before triggering the register 240, which captures the transient response bit string (i.e., the output of the PUF 220 in response to the challenge bit string). As described herein, the auxiliary circuit 230 introduces a time delay to the transient response enable signal 210. In some implementations, the PUF 220 is a hybrid Boolean network. A hybrid Boolean network includes clocked and un-clocked electronic devices or logical elements. Optionally, the PUF 220 constructed as a hybrid Boolean network is a chaotic oscillator configured as a modified random number generator (RNG). Alternatively, the PUF 220 constructed as a hybrid Boolean network is an autonomous logic circuit configured to solve Boolean satisfiability problems.

The hybrid Boolean network can be implemented with an FPGA, for example, by coding the design into a hardware programming language and compiling the code. Alternatively, the hybrid Boolean network can be implemented on an ASIC. Tiny manufacturing variations in signal pathways and input impedance to nodes of the hybrid Boolean network, whether implemented with an FPGA or an ASIC, are sufficient to give rise to different chaotic transient behaviors. As described herein, the hybrid Boolean network includes a plurality of electronic devices, where each electronic device (also referred to herein as "logical element") is configured to implement a Boolean operation.

The IC chip 200 includes a substrate, and the PUF 220 and the auxiliary circuit 230 are disposed on the substrate. In some implementations, the PUF 220 and the auxiliary circuit 230 are located in close physical proximity to each other on the substrate. For example, the PUF 220 and the auxiliary circuit 230 can optionally be located adjacent to one another on the substrate. The PUF 220 and the auxiliary circuit 230 can optionally be constructed using electronic devices that are located next to each other on the substrate. In other words, in this implementation, there would not be any intervening electronic devices located between the PUF 220 and the auxiliary circuit 230. It should be understood that locating the PUF 220 and the auxiliary circuit 230 adjacent to one another is provided only as an example of close physical proximity. For example, this disclosure contemplates that the PUF 220 and the auxiliary circuit 230 are in close physical proximity when the space between them is on micron scale (even if one or more electronic devices are arranged therebetween).

It should be understood that the characteristics of the PUF 220 change with temperature and/or supply voltage. In the following it should be understood that where temperature is referred to, similar statements about supply voltage apply. Additionally, it is desirable for the PUF 220 to function over relatively large temperature ranges and supply voltages. For example, the PUF 220 is a component of an electronic device, which may be subjected to various temperatures. Alternatively or additionally, the PUF 220 has a battery that provides less voltage as the battery is discharged. As noted above, the PUF's characteristics change with temperature and/or supply voltage. Typical clock signals (e.g., the transient response enable signal 210 shown in FIG. 2) used in the electronic devices in which the PUF 220 is integrated, however, have different temperature characteristics, which can negatively impact functionality of the PUF 220. For example, a clock signal may maintain the designed frequency as the temperature changes, but the time at which the PUF 220 should be measured to maximize its performance may change depending on the temperature. Thus, in order to provide a PUF that is robust with respect to temperature changes, the enable signal, which is generated by the physical device, is fed through the auxiliary circuit 230 before being used to trigger the register 240 to record the response of the PUF 220. The auxiliary circuit 230 is therefore configured to introduce a time delay which changes in a similar way as the PUF 220 with temperature and voltage. A duration of the time delay is related to a characteristic time scale of the PUF 220. As a result, the PUF 220 exhibits improved temperature stability as compared to conventional PUFs.

Similar to the PUF 220, the auxiliary circuit 230 includes a plurality of electronic devices (also referred to herein as "logical elements"). The auxiliary circuit 230 therefore includes the same type of electronic devices included in the PUF 220. In other words, the temperature characteristics of the component devices of the PUF 220 and auxiliary circuit 230 are the same. Additionally, the auxiliary circuit 230 can be implemented with an FPGA or an ASIC (i.e., in the same manner as the PUF 220). As discussed above, the auxiliary circuit 230 is designed to introduce a time delay. In some implementations, each electronic device is configured to implement a Boolean operation. For example, the auxiliary circuit 230 can include a plurality of pairs of series-connected inverter gates. In other implementations, each electronic device is configured to implement a copy operation. It should be understood that the number of electronic devices in the auxiliary circuit 230 is directly related to the duration of time delay. For example, a greater number of electronic devices through with the transient response enable signal 210 is fed before being input into the register 240 results in a longer time delay. Accordingly, the number of electronic devices in the auxiliary circuit 230 can be selected based on the characteristic time scale of the PUF 220. As an example, the delay line of the auxiliary circuit 230 can be configured so that the duration of the time delay is about 10 characteristic time scales. It should be understood that 10 characteristic time scales is provided only as an example. This disclosure contemplates using a time delay more or less than 10 characteristic time scales.

Figures 3A, 3B:
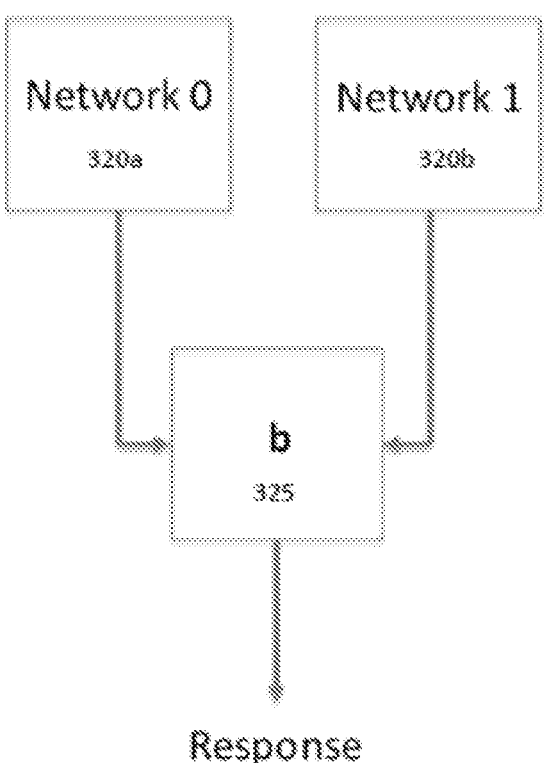
FIG. 3A is a block diagram illustrating a plurality of physically unclonable functions (PUFs) for use with an IC chip according to an implementation described herein.
FIG. 3B shows an example of an A XOR B truth table.

Optionally, in some implementations, the IC chip 200 further includes a plurality of PUFs, where each PUF includes a respective hybrid Boolean network. For example, a plurality of PUFs are illustrated in FIG. 3A. In FIG. 3A, there are two PUFs, i.e., PUF 320a ("Network 0") and PUF 320b ("Network 1"). PUFs 320a and 320b are collectively referred to herein as PUFs 320. It should be understood that the two PUFs 320 are provided only as an example. This disclosure contemplates including more than two PUFs in the IC chip. Additionally, a combiner circuit 325 is provided. The combiner circuit 325 is configured to combine respective outputs of each of the PUFs 320. For example, the combiner circuit 325 can be configured to sample the respective bit strings output by PUFs 320 and combine these bit strings using a criterion. In some implementations, the combiner circuit 325 is a selector bit that is configured to flip according to a criterion (e.g., b=0: use certain bits from Network 0; b=1: use certain bits from Network 1). Alternatively or additionally, in some implementations, the criterion is a random number at manufacture time. Alternatively or additionally, in other implementations, the combiner circuit 325 includes a PUF, which is used to generate the criterion.

Referring to FIG. 4, implementations of the present disclosure are directed to methods for using PUFs. As noted above, a PUF can be implemented using a physical device that has a unique "fingerprint" based on manufacturing variations in the device. The manufacturing variations can be sufficiently small such that it is difficult or essentially impossible to make a copy or clone of the device including the same fingerprint as the original device. As such, PUFs can be used to produce secure cryptographic keys.

The present disclosure contemplates that different types of PUFs can be used in the different implementations described herein, but a non-limiting example of a specific type of PUF that can be used in some implementations is a PUF based on a hybrid Boolean network ("HBN PUF"), which can include an analog-like electronic circuit. HBN PUFs are described, for example, in WO2020/247059, published Dec. 10, 2020, titled "Systems and methods using hybrid Boolean networks as physically unclonable functions," the disclosure of which is incorporated by reference in its entirety.

As noted herein, a PUF is a physical device that has a unique fingerprint that can be used to authenticate the device or to generate a cryptographic key for cybersecurity applications. The fingerprint arises from tiny manufacturing variation of the device and, ideally, it is essentially impossible to make a copy or clone the device so that it has the same fingerprint. Importantly, the fingerprint is not stored as digital data on the device, which could be learned by a sophisticated attacker and thus compromising the security of the device.

Recently, a new PUF concept was disclosed [1] based on an analog-like electronic circuit known as a hybrid Boolean network (HBN-PUF). The HBN-PUF operates by initializing the N-node network with N challenge bits $C=\{0, 1\}^N$. The network is then released from the initial state and allowed to evolve in time, self-generating complex dynamics. After a short time, typically a few nanoseconds, the analog voltages of the network nodes are read and turned into Boolean (0 or 1) values, resulting in an N-bit response $R=\{0, 1\}^N$.

The HBN-PUF is strong because a single device produces a nearly uncountable number of challenge-response pairs when N is large [2]. Here, the definition of large depends on the computational capabilities of an attacker but is typically equal to or larger than 128 for current-day systems. Each HBN-PUF produces 2 N challenge-response pairs. For example, with N=256, this number is $\sim 10^{77}$, which is comparable to the estimated number of atoms in the universe.

The device is characterized by an entropy that scales with the number of challenge-response pairs. An entropy source is a fundamental building block for many cybersecurity applications, and the HBN-PUF can give a high-level of security because the cryptographic key (a set of unique and random bits) is never stored on the device: it is regenerated in real time whenever it is needed. The entropy of the HBN-PUF scales as $N2^N$ [2], which means that exceedingly large cryptographic keys can be generated.

As described herein, before being deployed to the field, a PUF must undergo an enrollment phase. Here, a large number K of randomly-chosen challenges $C_k$ are applied to the PUF and the corresponding responses $R_k$ are recorded in a database. These are referred to challenge-response pairs (CRPs). Denote the set of CRPs as:

$$C^K = \{C_1, C_2 \ \dots \ C_K\}, \qquad \text{Eq. 1}$$

$$R^K = \{R_1, R_2 \ \dots \ R_K\}. \qquad \text{Eq. 2}$$

This is the fundamental starting point for most cybersecurity applications that use PUFs. Unfortunately, the CRP database can potentially lead to insecurity of protocols that use PUFs as an entropy device. The database contains all the secrets of all the devices and hence protocols using a PUF will be broken if an attacker gains access to the database. For high-speed protocol execution, the database is typically accessible through a secure internet connection. If an eavesdropper finds a way to break the encrypted internet connection, the database will be exposed and the protocol can be fully broken. The chance of such an attack is high based on numerous examples of how adversaries have gained access to supposedly secure databases accessible over the internet.

Note on PUF errors: In all PUFs, there are errors in response bit string $R_k$ so that repeated application of a challenge $C_k$ results in a slightly different response $R_k$. It is well-known in the prior art that a reliable response can be generated using error-correction methods, which require auxiliary 'helper data' to reconstruct a stable response while not leaking substantial information about the response bits to an eavesdropper. In our discussions below, it is assumed that an error-correction method is implemented and that the responses are reliable.

Embodiments of the present disclosure use the response of one PUF to secure the responses of one or more additional PUFs, thus creating a perfect secret correlation between them and binding the two PUFs. For simplicity, we discuss using only two PUFs but this can be generalized to many PUFs by an expert in the prior art. For the two-PUF scenario, one PUF will eventually be used by a first end-user of PUF "A" and the other by a second end-user of PUF "B", as described in more detail below.

Referring now to FIG. 4, an implementation of a method 400 for securing responses of one or more PUFs is illustrated. In some implementations, the method 400 can be performed by or in conjunction with a computing device (for example, but not limited to, the physical device 102 and/or verifier device 104 described above in connection with FIG. 1). For example, the computing device can be configured to input challenge bit strings into one or more PUFs and receive response bit strings from the one or more PUFs.

Securing one PUF with another PUF can be referred to as "binding" one PUF to another PUF. The method 400 can include inputting, at step/operation 402 a first challenge bit string into a first PUF and capturing, at step/operation 404, a first response bit string from the first PUF. The method can further include inputting, at step/operation 406 a second challenge bit string into a second PUF and capturing, at step/operation 408, a second response bit string from the second PUF. In the example above, it should be understood that the first and second PUFs are different PUFs. The challenge bit strings that are input into the first PUF and input into the second PUF at step/operation 402 and step/operation 406 can be the same, or different. Implementations of the present disclosure where the first and second challenge bit strings are different can be more secure (i.e., the level of security increases). As discussed above, the first and second responses are unique to the first and second PUFs, respectively.

The sets of challenges and responses can be denoted generally by equations 3 and 4, below, where C denotes a challenge, R denotes a response. The first superscript "A" or "B" represents the two unique PUFs (e.g., the first and second PUFs), and K denotes the index of the challenge. It should be understood that the present disclosure contemplates that any number of challenges, responses, indices, and PUFs can be used, and that the equations described herein are intended only as non-limiting examples.

$$C^{A,K} = \{C_1^A, C_2^A, \dots, C_K^A\} \qquad \text{Eq. 3}$$

$$R^{A,K} = \{R_1^A, R_2^A, \dots, R_K^A\} \qquad \text{Eq. 4}$$

$$C^{B,K} = \{C_1^B, C_2^B, \dots, C_K^B\} \qquad \text{Eq. 5}$$

$$R^{B,K} = \{R_1^B, R_2^B, \dots, R_K^B\} \qquad \text{Eq. 6}$$

The enrollment of the PUFs can be performed by a trusted third party, but with the important distinction that the enrollment is performed in a secure facility not connected to the internet. In some implementations, both $C^{A,K}$ and $C^{B,K}$ are chosen randomly and independently and hence these are different bit sequences indexed by the order in which they are generated.

The method 400 can further include performing, at step/operation 410, a hash operation on the first response bit string of the first PUF and the second response bit string of the second PUF, to generate a hashed-response bit string. As a non-limiting example, the hash operation can be an XOR operation on the first and second response bit strings. The term XOR operation is a bitwise operator meaning "exclusive or" and performs a logical operation such that if input bits are the same an output is false (0), and if the input bits are not the same, the output is true (1). It should be understood that an XOR operation is only provided as an example hash operation. In other words, the XOR operation is true only if its arguments differ. An example truth table of A XOR B is provided in Table 1, shown in FIG. 3B, where the output is true whenever inputs differ.

The present disclosure contemplates that any other type of hashing operation can be used. Additionally, in some implementations, the first and second response bit strings can be deleted after performing the hashing operation. Equation 7, below, denotes an example sequence of hashed responses produced by an XOR operation.

$$R^{A \oplus K} = \{R_1^A \oplus R_1^B, R_2^A \oplus R_2^B, \ldots, R_K^A \oplus R_K^B\}$$

In some implementations, subsequent to performing step/operation 410 the hash operation, the trusted third party deletes the original responses $R^{A,K}$ and $R^{B,K}$ and publicly posts the indexed database of the challenges $C^{A,K}$ and $C^{B,K}$, and the corresponding hashed response values $R^{A \oplus B}$. Importantly, $R^{A \oplus B}$ reveals no information about the individual responses in the ideal case when the response bit patterns are random. The third party delivers the PUFs to a first end-user and a second end-user (e.g., PUF "A" and PUF "B"), which can now be used for many cryptographic protocols that require the first end-user and the second end-user (e.g., PUF "A" and PUF "B") to share common secrets.

Returning to FIG. 4, the method 400 can further include storing, at step/operation 412 the first and second challenge bit strings and the hashed-response bit string in a first database. Corresponding challenge and hashed-response bit strings are associated with an index (see e.g., the subscripts on the right-hand side of the symbols given in Eq. 7 above). The database can be used to provide cybersecurity. For example, this can include using the challenge-hash response pairs in the database for encrypting and/or decrypting messages. This can include using a challenge-hashed-response pair from the database to implement one-time pad encryption of a message, and/or decryption of a method secured with a one-time pad. The present disclosure contemplates that the database can be publicly accessible, and that the public database cannot be used by third parties (without access to the PUFs) to decrypt the messages. Applications for the database are also described in further detail in the Examples below.

Additionally, while FIG. 4 and the method 400 describe how the method can be used to secure responses for two PUFs, it should be understood that implementations of the present disclosure can be used to secure responses for any number of PUFs. For example, the method 400 can include inputting a third challenge bit string into the first PUF and capturing a third response bit string from the first PUF. The method can further include inputting a fourth challenge bit string into a third PUF and capturing a fourth response bit string from that third PUF. Similar to above, it should be understood that the first and third PUFs are different PUFs. Additionally, this disclosure contemplates that the third and fourth challenge bit strings used to secure responses for the first and third PUFs may be the same or different than the first and second challenge bit strings used to secure responses for the first and second PUFs. The method can further include performing a hash operation on the third response bit string and the fourth response bit string. This disclosure contemplates that the hash operation used to secure responses for the first and third PUFs may be the same or different than the hash operation used to secure responses for the first and second PUFs. The hash operation on the third response bit string and the fourth response bit string can generate a second hashed-response bit string, and the second hashed-response bit string can be stored in a database (e.g., the same database as the hashed-response bit string associated with the first and second PUFs). It should be understood that this can be extended to any number of PUFs, so a fourth, fifth, sixth, etc. PUF's response bit string to a challenge could be hashed with the response bit string associated with the first PUF to generate a hashed-response bit string, and so on.

Additionally, in implementations where more than one PUF is bound to another PUF, additional databases can be used. For example, each PUF that is bound to another PUF can have a separate challenge response database associated with that PUF. In some implementations of the present disclosure, the challenge response databases for each PUF can be stored in a single file, but the challenge response databases for each PUF can also be stored in separate files where each file corresponds to the database associated with one or more PUFs.

Figure 5:
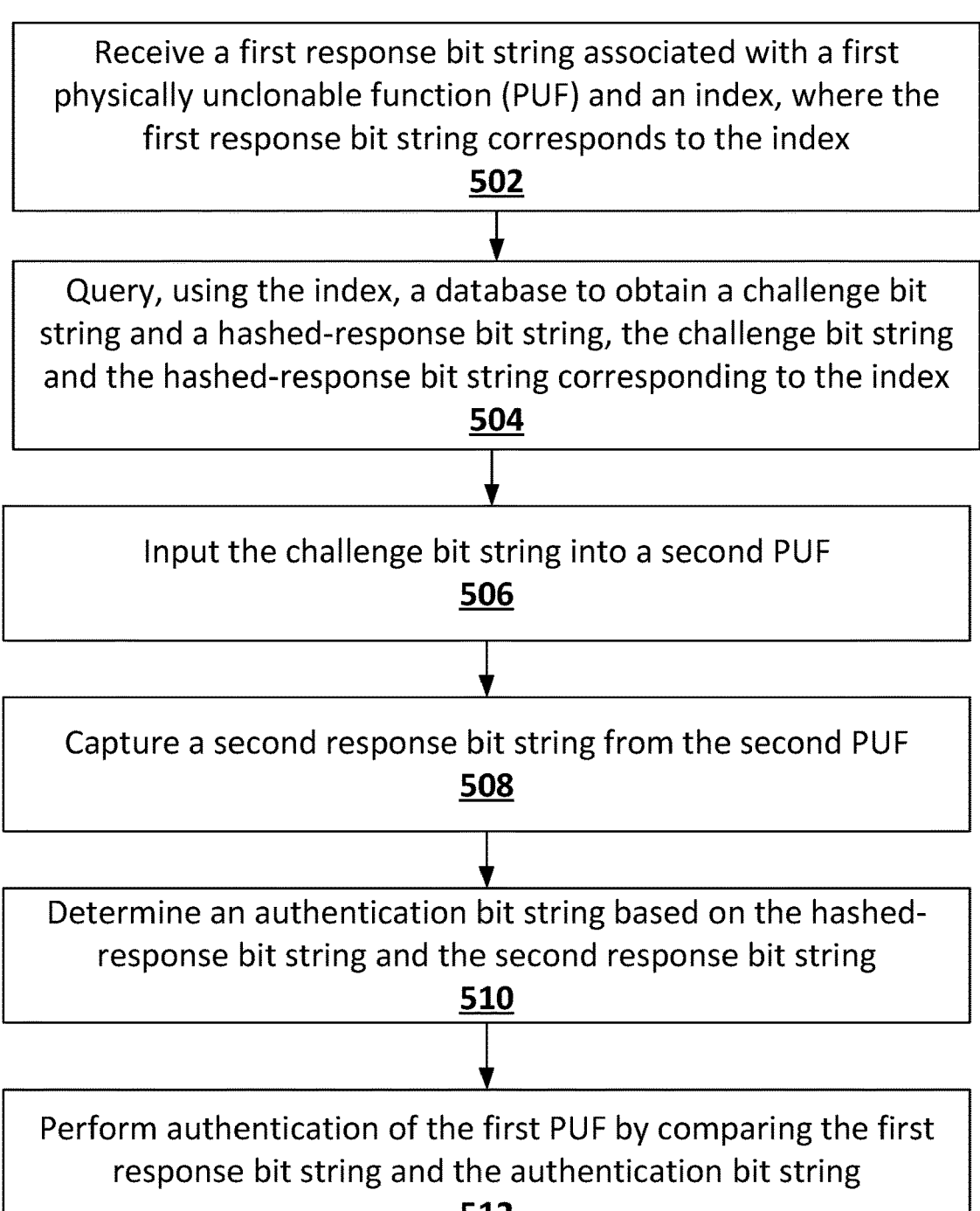
FIG. 5 illustrates a method of authenticating a user and/or a device according to one implementation of the present disclosure.

The present disclosure also includes methods for authenticating a user and/or device using PUFs. As illustrated in FIG. 5, the method 500 can include receiving, at step/operation 502, a first response bit string associated with a first PUF and an index, where the first response bit string corresponds to the index. As described in the Examples below, the first response bit string can be obtained by inputting a challenge bit string into the first PUF and capturing the first response bit string. Optionally, the challenge bit string is randomly selected. As a non-limiting example, the challenge bit string can be the challenge bit string associated with a randomly selected index. The first response bit string can be received from a remote device over a network. As a non-limiting example, the present disclosure contemplates that the first and second PUFs can be operably connected to a respective computing device (e.g., the device illustrated in FIG. 6) and that two or more devices operably connected with the first and second PUFs can communicate (e.g., by the network connection 616 illustrated in FIG. 6).

Step 504 includes querying the database using the index (e.g., received at step 202) to obtain the challenge bit string and a hashed-response bit string. The challenge bit string and the hashed-response bit string can correspond to the index. In some implementations, the database includes a number of challenge-hashed-response pairs, where each challenge-hashed-response pair can include a respective challenge bit string and respective hashed-response bit string, can be maintained.

At step/operation 506, the challenge bit string is input into a second PUF. A second response bit string can be captured at step/operation 508 from the second PUF.

Based on the hashed-response bit string obtained at step/operation 504, and the second response bit string captured at step/operation 508 from the second PUF, an authentication bit string can be determined at step/operation 510, for example by using EQ. 8 (below), which relates the responses of two PUFs labeled "A" and "B" at an index i.

$$R_i^B \oplus \left(R_i^A \oplus R_i^B\right) = R_i^A$$

It should be understood that the above equation can be adapted to determine 510 the authentication bit string when different hashing methods other than XOR are used.

Returning to FIG. 5, at step/operation 512, the method 500 includes authentication of the first PUF (and user and/or device associated with the first PUF) can be performed by comparing the first response bit string and the authentication bit string. When the first response bit string and the authentication bit string are identical, the first PUF is authenticated. Conversely, when the first response bit string and the authentication bit string are not identical, the first PUF is not authenticated. In other words, the first PUF (and user and/or device associated with the first PUF) is "not authenticated" when the authentication bit string is not identical to the first response bit string. And, the first PUF (and user and/or device associated with the first PUF) is "authenticated" when the first response bit string is identical to the authentication bit string. Optionally, in some implementations, authentication at step/operation 512 can be based on whether the authentication bit string and first response bit string are similar, or close to identical. In other words, the authentication protocol may account for communication errors. It should be understood that PUFs can include errors in the response bit string, such that repeating the same challenge can give different responses. The present disclosure contemplates that error correction methods can be applied to any of the challenges and/or responses included in the methods described herein to increase the accuracy of the challenge response pairs produced by the PUF. In some implementations of the present disclosure, information from a database can be provided to a user based on the authentication performed at step/operation 512. As a non-limiting example, different users can be associated with different levels of access to the databases (e.g., only permitted to view certain types of data, or certain categories of data), and data that corresponds to a user's level of access can be provided to that user based on the authentication 512.

By way of example, in order to share secrets between PUF "A" and PUF "B," challenge $$C_i^B$$

can be applied to PUF "B" which generates response $$R_i^B.$$

PUF "B" can query a public database to obtain $$R_i^A \oplus R_i^B$$

with which an XOR operation is performed in accordance with Eq. 8 above. PUF "B" can obtain PUF "A"'s response with certainty for the same index challenge. No other sequence of bits {0, 1} N will unlock PUF "A"'s response; even a different response $$R_j^B (i \neq j)$$

from PUF "B" will fail to recover PUF "A"'s response, including a bit sequence generated by an eavesdropper. A similar procedure can be performed by PUF "A" to obtain with certainty one of PUF "B"'s responses. Thus, the two parties have secured shared secrets.

Embodiments of the present disclosure contemplate binding one PUF to many PUFs by repeating the procedure above. Take, for example, binding PUF "A" to PUF "D". A superscript D will be used in the symbols for PUF "D."

As described herein, PUF "A" and PUF "D" generate challenge-response pairs. In general, PUF "A" uses a different set of challenges in comparison to the ones used to bind PUF "A" to PUF "B". To make this distinction clearer, the symbol J is used to indicate the sets. The enrollment of PUF "A" and PUF "D" is performed by a trusted third party as usual, but with the important distinction that the enrollment is performed in a secure facility not connected to the internet.

The J CRPs generated by PUF "A" is denoted as:

$$C^{A,J} = \left\{ C_1^A, C_2^A, \dots, C_J^A \right\} \qquad \text{Eq. 9}$$

$$R^{A,J} = \left\{ R_1^A, R_2^A, \dots, R_J^A \right\} \qquad \text{Eq. 10}$$

The J CRPs generated by PUF "D" is denoted as:

$$C^{D,J} = \left\{ C_1^D, C_2^D, \dots, C_J^D \right\} \qquad \text{Eq. 11}$$

$$R^{D,J} = \left\{ R_1^D, R_2^D, \dots, R_J^D \right\} \qquad \text{Eq. 12}$$

Both $C^{A,J}$ and $C^{D,J}$ are chosen randomly and independently and hence these are different bit sequences indexed by the order in which they are generated. Applying the hash (e.g., XOR) operation results in a sequence of hashed responses given by:

$$R^{A \oplus D} = \left\{ R_1^A \oplus R_1^D, R_2^A \oplus R_2^D, \dots, R_J^A \oplus R_J^D \right\}. \qquad \text{Eq. 13}$$

After this operation, the trusted third party deletes the original responses $R^{A,J}$ and $R^{D,J}$ and publicly posts the indexed database of the challenges $C^{A,J}$ and $C^{D,J}$, and the corresponding hashed response values $R^{A \oplus D}$.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
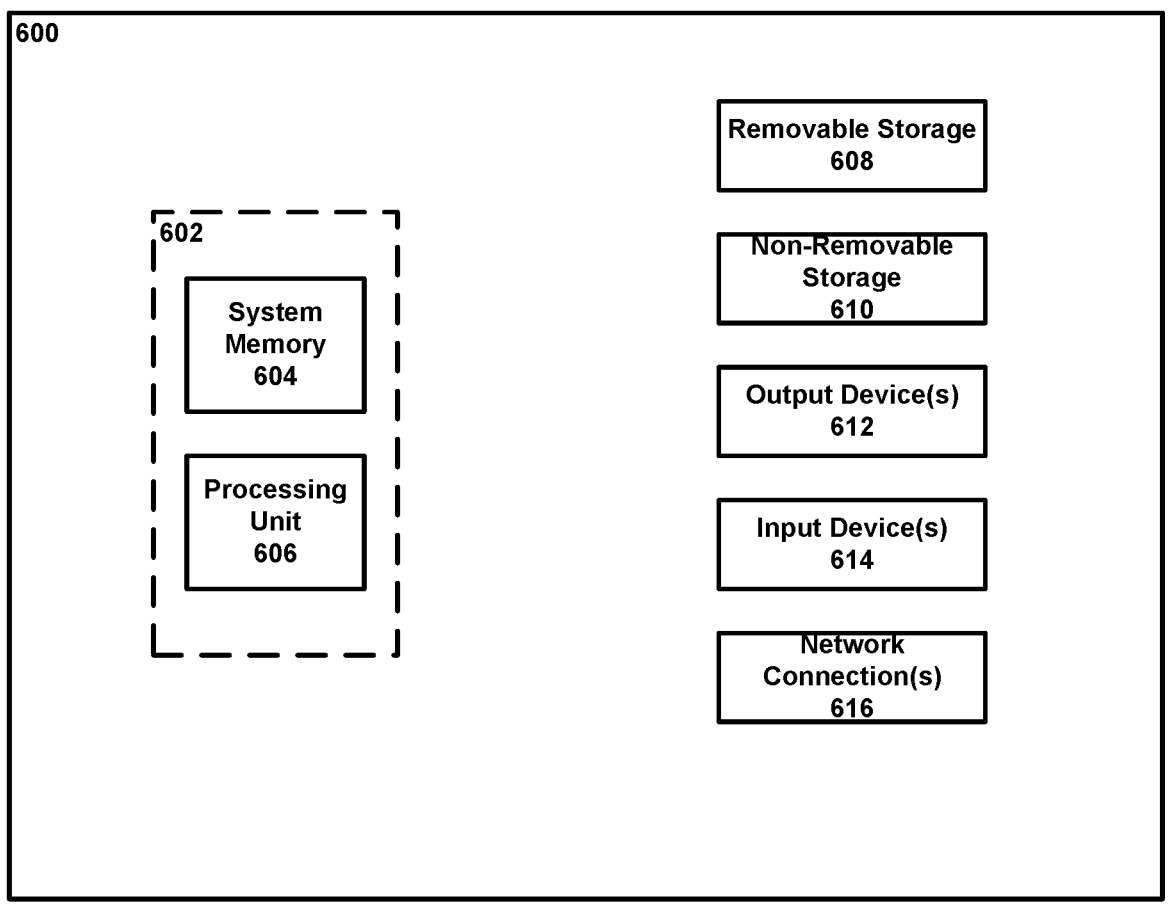
FIG. 6 illustrates an example computing device.

Referring to FIG. 6, an example computing device 600 upon which the methods described herein may be implemented is illustrated. It should be understood that the example computing device 600 is only one example of a suitable computing environment upon which the methods described herein may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random-access memory (RAM)), nonvolatile (such as read-only memory (ROM), flash memory, etc.), or some combination of the two. This most basic configuration is illustrated in FIG. 5 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/ functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Example Application: Authentication Using PUF
Technology without a Challenge-Response
Database Consider a scenario where a user of PUF "B" wants to authenticate the user of PUF "A". The user of PUF "A" selects a challenge from $C^{A,K}$ with randomly selected index p, which is denoted by $$C_p^A.$$

The user queries PUF "A" to obtain $$R_p^A$$

and sends it and the index p to the user of PUF "B." The user of PUF "B" applies $$C_p^B$$

to obtain $$R_p^B.$$

The user of PUF "B" queries the database to obtain $$R_p^A \oplus R_p^B$$

and uses Eq. 8 to obtain $$R_p^A.$$

The user of PUF "B" compares the generated $$R_p^A$$

to the one sent by PUF "A". If they are identical, the user of PUF "B" authenticates the user of PUF "A". A similar procedure can be used for the user of PUF "A" to authenticate the user of PUF "B."

This algorithm, based on embodiments of the present disclosure, avoids the insecurity of the CRP database discussed herein.

Example Application: Encrypting/Decrypting Messages Using a PUF-Enabled One-Time Pad Given the large size of the set of random numbers that can be generated by an HBN-PUF, it opens up the possibility of encrypting/decrypting messages based on an algorithm known as a one-time pad. A one-time pad is known to be the most secure method of encrypting/decrypting messages and hence keeping it secret from an eavesdropper.

The one-time-pad algorithm for passing a message from Alice to Bob requires that they share a secure sequence of random bits. The algorithm described in the invention allows for sharing such a sequence that is protected from an eavesdropper. The PUF-enabled one-time-pad algorithm is briefly described as follows.

When the user of PUF "A" wants to send the user of PUF "B" a plain-text message, the user of PUF "A" converts the message M to binary format $\{0, 1\}^M$. Next, the user of PUF "A" queries PUF "A" with Q random indices $\{p\}^Q$ to obtain Q responses $$\{R_p^A\}^Q.$$

Each response produces N bits and so Q×N total bits are generated. Q×N≥M is required.

In the next step of the algorithm, the user of PUF "A" performs a hash operation, taken to be an XOR operation for exposition simplicity, to generate an encrypted message (mnemonic e) given by:

$$M_e = M \oplus \{R_p^A\}^Q \qquad \text{Eq. 14}$$

The user of PUF "A" sends M e and the indices $\{p\}^Q$ $\{p\}Q$ to the user of PUF "B" Bob. Using the procedure described above, the user of PUF "B" queries PUF "B" using indices $\{p\}^Q$ and generates $$\{R_p^A\}^Q$$

using Eq. 8. With these responses in hand, the user of PUF "B" decrypts the message by performing the hash operation:

$$M \oplus \{R_p^A\}^Q = M \qquad \text{Eq. 15}$$

and hence recovers the message sent by PUF "A".

To achieve the highest level of security, the user of PUF "A" never reuses the indices $\{p\}^Q$, hence the name one-time pad. Reusing the indices opens up avenues for an attack from an eavesdropper and hence must be avoided. Only the HBN-PUF [1, 2] has a high enough entropy to be used in this example one-time-pad cryptographic application.

Embodiments of the present disclosure remove the requirement that the PUF be physically exchanged between two parties to complete the process as disclosed in previous proposals [3, 4].

Example Application: Database Security Using a PUF-Enabled One-Time Pad

Another application using the vast amounts of entropy available in the HBN-PUF is to secure data at rest contained in a database. Here, we refer to a general database containing sensitive information and should not be confused with the challenge/response database mentioned in the previous sections. Data at rest in such a database, even when encrypted, is known to be susceptible to hacking. Here, they perform a brute-force attack on the encrypted database on their own hardware, for example, assuming that they have a copy.

One mitigation against this type of attack is to encrypt each row of a database with a different encryption key, so that the attacker will have to repeatedly break the encryption for each row of the database. However, this requires storing a database of keys that can similarly be stolen and used to compromise the database.

Using the HBN-PUF, we can extract a single key that is used for encrypting and decrypting for each row of the database. Because the key is not stored but regenerated, the attacker would need to either physically capture the HBN-PUF, which greatly increases the cost of the attack, or continuously query it remotely, which will generate excessive network traffic and alert the victim.

In addition to directly encrypting the database with the PUF responses, we can use the same techniques as above to allow a database to be shared between parties.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All references cited and discussed in this specification are incorporated herein by reference in their entireties and to the same extent as if each reference was individually incorporated by reference.

REFERENCES

[1] A. Pomerance, D. Gauthier, D. Canaday, and N. Charolot, 'Systems and methods using hybrid Boolean networks as physically unclonable functions,' PCT/US2020/027072, filed Apr. 7, 2020.

[2] N. Chariot, D. Canaday, A. Pomerance, and D. J. Gauthier, 'Hybrid Boolean networks as physically unclonable functions,' IEEE Access 9, 44855 (2021).

[3] M. Van Dijk, 'System and method of reliable forward secret key sharing with physical random functions,' U.S. Pat. No. 7,653,197, January 2010.

[4] M. van Dijk and U. Ruhrmair, 'Physical unclonable functions in cryptographic protocols: Security proofs and impossibility results,' IACR Cryptology ePrint Archive, vol. 2012, pp. 228, April 2012.

What is claimed:

1. A method, comprising:
inputting a first challenge bit string into a first physically unclonable function (PUF);
capturing a first response bit string from the first PUF;
inputting a second challenge bit string into a second PUF;
capturing a second response bit string from the second PUF;
performing a hash operation on the first response bit string of the first PUF and the second response bit string of the second PUF, the hash operation generating a hashed-response bit string; and
storing the first and second challenge bit strings and the hashed-response bit string in a first database.

2. The method of claim 1, further comprising deleting the first response bit string and the second response bit string after performing the hash operation.

3. The method of claim 1, wherein the step of performing the hash operation comprises performing an XOR operation on the first response bit string of the first PUF and the second response bit string of the second PUF.

4. The method of claim 1, further comprising:
inputting a third challenge bit string into the first PUF;
capturing a third response bit string from the first PUF;
inputting a fourth challenge bit string into a third PUF;
capturing a fourth response bit string from the third PUF;
performing a second hash operation on the third response bit string of the first PUF and the fourth response bit string of the third PUF, the hash operation generating a second hashed-response bit string; and
storing the third and fourth challenge bit strings and the second hashed-response bit string in a second database.

5. The method of claim 4, wherein at least one of the first PUF, the second PUF, and the third PUF is embodied as an integrated circuit (IC) chip.

6. The method of claim 5, wherein the IC chip is a field-programmable gate array (FPGA) or an application-specific integrated circuit (ASIC).

7. The method of claim 1, further comprising using the first database for cybersecurity.

8. The method of claim 1, further comprising using the first database for encrypting or decrypting a message.

9. The method of claim 8, further comprising selecting a challenge-hashed-response pair from the first database, the challenge-hashed-response pair being a one-time pad.

10. The method of claim 1, further comprising maintaining the first database as a publicly accessible database.

11. A method, comprising:
receiving a first response bit string associated with a first physically unclonable function (PUF) and an index, wherein the first response bit string corresponds to the index;
querying, using the index, a database to obtain a challenge bit string and a hashed-response bit string, the challenge bit string and the hashed-response bit string corresponding to the index;
inputting the challenge bit string into a second PUF;
capturing a second response bit string from the second PUF;
determining an authentication bit string based on the hashed-response bit string and the second response bit string; and
performing authentication of the first PUF by comparing the first response bit string and the authentication bit string.

12. The method of claim 11, wherein the first response bit string and the index are received from a remote device over a network.

13. The method of claim 11, further comprising maintaining the database, wherein the database comprises a plurality of challenge-hashed-response pairs, each challenge-hashed-response pair comprising a respective challenge bit string and a respective hashed-response bit string.

14. The method of claim 11, wherein the first PUF is authenticated when the authentication bit string is identical to the first response bit string.

15. The method of claim 11, wherein the first PUF is not authenticated when the authentication bit string is not identical to the first response bit string.

16. The method of claim 11, further comprising using the first PUF to restrict access to one or more databases.

17. A system comprising:
a physical device;
a first IC chip comprising a first PUF configured to receive a first challenge bit string from the physical device, and generate a first response bit string;
a second IC chip comprising a second PUF configured to receive the first response bit string from the first PUF, receive a second challenge bit string from the physical device, and generate a second response bit string,
wherein:
the physical device is configured to capture the second response bit string from the second PUF, and
perform a hash operation on the first response bit string of the first PUF and the second response bit string of the second PUF, the hash operation generating a hashed-response bit string; and a database configured to receive and store the first challenge bit string, the second challenge bit string, and the hashed-response bit string.

18. The system of claim 17, wherein each of the first PUF and the second PUF comprises a hybrid Boolean network.

19. The system of claim 17, wherein the step of performing the hash operation comprises performing an XOR operation on the first response bit string of the first PUF and the second response bit string of the second PUF.

20. The system of claim 17, wherein at least one of the first IC chip and the second IC chip is a FPGA or an ASIC.

\* \* \* \* \*